United States Patent [19]
Cox

[11] Patent Number: 5,097,919
[45] Date of Patent: Mar. 24, 1992

[54] SURFACE EFFECT VEHICLE

[75] Inventor: Malcolm J. Cox, Bannister Park, England

[73] Assignee: Dowty Woodville Polymer Limited, Ross-on-Wye, England

[21] Appl. No.: 546,877

[22] Filed: Jul. 2, 1990

[30] Foreign Application Priority Data

Jul. 5, 1989 [GB] United Kingdom ............... 8915419

[51] Int. Cl.$^5$ .............................................. B60V 1/11
[52] U.S. Cl. ....................................... 180/117; 440/37
[58] Field of Search ............... 180/116, 122, 128, 117; 239/265.35, 265.37; 244/110 B; 440/37

[56] References Cited

U.S. PATENT DOCUMENTS

| | | | |
|---|---|---|---|
| 3,276,738 | 10/1966 | Downhill | 180/122 |
| 3,608,662 | 9/1971 | Ferguson | 180/116 X |
| 3,777,842 | 12/1973 | Laufman | 180/117 |
| 4,052,007 | 10/1977 | Willard | 239/265.37 X |
| 4,397,367 | 8/1983 | Ivanov et al. | 180/117 |
| 4,421,489 | 12/1983 | Van Veldhuizen | 440/37 |
| 4,643,268 | 2/1987 | Jones et al. | 180/116 |
| 4,736,840 | 8/1988 | Madden | 239/265.35 |
| 4,778,109 | 10/1988 | Jourdain et al. | 239/265.35 X |

FOREIGN PATENT DOCUMENTS 2088302 6/1982 United Kingdom .
2098942 12/1982 United Kingdom .
2098943 12/1982 United Kingdom .

*Primary Examiner*—Charles A. Marmor
*Assistant Examiner*—Paul Dickson
*Attorney, Agent, or Firm*—Young & Thompson

[57] ABSTRACT

A surface effect vehicle has a propulsion and guidance system comprising a thrust generator (2) for producing a flow of fluid, a duct (7) adapted to receive the flow of fluid from the generator (2) and to conduct this to an outlet opening (11), a pair of rudders (14) mounted on opposite sides of the outlet opening (11) so as to be angularly adjustable relative to the outlet opening (11) to vary the extent to which they obstruct the outlet opening (11), and a rudder control system (17, 18, 19, 33, 34) adapted to move the rudders (14) together in the same sense between extreme angular positions in which the air flow is deflected to one side or the other of the outlet opening (11), wherein the rudder control system is adapted to move the rudders (14) in the opposite sense to one another so that they close together across the outlet opening (11) and thereby cause the fluid flow therefrom to be substantially progressively reversed. A wall (29) surrounds the duct (11) at the outlet opening and cooperates with the rudders (14) when they are closed together so as to receive the reverse flow of fluid from the outlet opening. Vanes (31) on the upper edges of the rudders (14) close together with the rudders.

16 Claims, 4 Drawing Sheets

SURFACE EFFECT VEHICLE

This invention relates to a surface effect vehicle and in particular to the propulsion and guidance system of such a vehicle whereby lateral movement of the vehicle in all directions is controlled.

It is well known in a surface effect vehicle, such as a hovercraft, to provide a propulsion and guidance system comprising a thrust generator in the form of a fan which forces a flow of air rearwards through a duct so as to propel the vehicle forwards, and to provide angularly adjustable vanes or rudders at the exit of the duct so as to deflect the air flow to one side or the other of the duct and thereby turn the vehicle left or right. It has also been suggested that an angularly adjustable vane can be provided within the duct so as to block off the rearward flow of air and re-direct this in a forward direction, thereby applying a reverse thrust to the vehicle. With a vehicle having a pair of ducts, one either side of the vehicle, each fitted with a vane for reverse thrust, these vanes can be used selectively to turn the vehicle or propel it in reverse.

An object of the present invention is to provide a surface effect vehicle with an improved propulsion and guidance system for controlling lateral movement of the vehicle in all directions.

According to the present invention, a surface effect vehicle has a propulsion and guidance system comprising a thrust generator for producing a flow of fluid, a duct adapted to receive the flow of fluid from the generator and to conduct this to an outlet opening, a pair of rudders mounted on opposite sides of the outlet opening so as to be angularly adjustable relative to the outlet opening to vary the extent to which they obstruct the outlet opening, and a rudder control system adapted to move the rudders together in the same sense between extreme angular positions in which the air flow is deflected to one side or the other of the outlet opening, wherein the rudder control system is adapted to move the rudders in the opposite sense to one another so that they close together across the outlet opening and thereby cause the fluid flow therefrom to be substantially progressively reversed.

Thus the invention provides one pair of rudders that are controlled both for steering left and right and also for changing between forward and reverse thrust.

Preferably, a wall surrounds the duct at the outlet opening and cooperates with the rudders when they are closed together so as to receive the reverse flow and direct this forward. The rudders may be pivoted about upright parallel axes and the upper edges of the rudders formed with inwardly directed vanes that meet to substantially close the opening between the upper edges of the rudders when the rudders are closed together.

Two similar ducts, each with a pair of rudders for controlling steering and forward and reverse thrust, may be provided one either side of the vehicle and may be provided with a thrust generator in the form of individual fans, preferably centrifugal fans, to supply air to each duct separately. A first manually operable control system controls the rudders so that they operate together in the same sense for steering, and a second manually operable control system controls the rudders so that either or both can be selectively closed together to produce reverse thrust.

Preferably, the second control system is adapted so that when the rudders are opened from the fully closed position, one rudder moves preferentially compared to the other so as to produce a slight lateral thrust, preferably inwards of said pair of ducts. This lateral thrust gives a predictable characteristic which can be used for steering in reverse by momentary opening and closing movements of each pair of rudders.

The invention will now be described by way of example with reference to the accompanying drawings in which.

Figure 1:
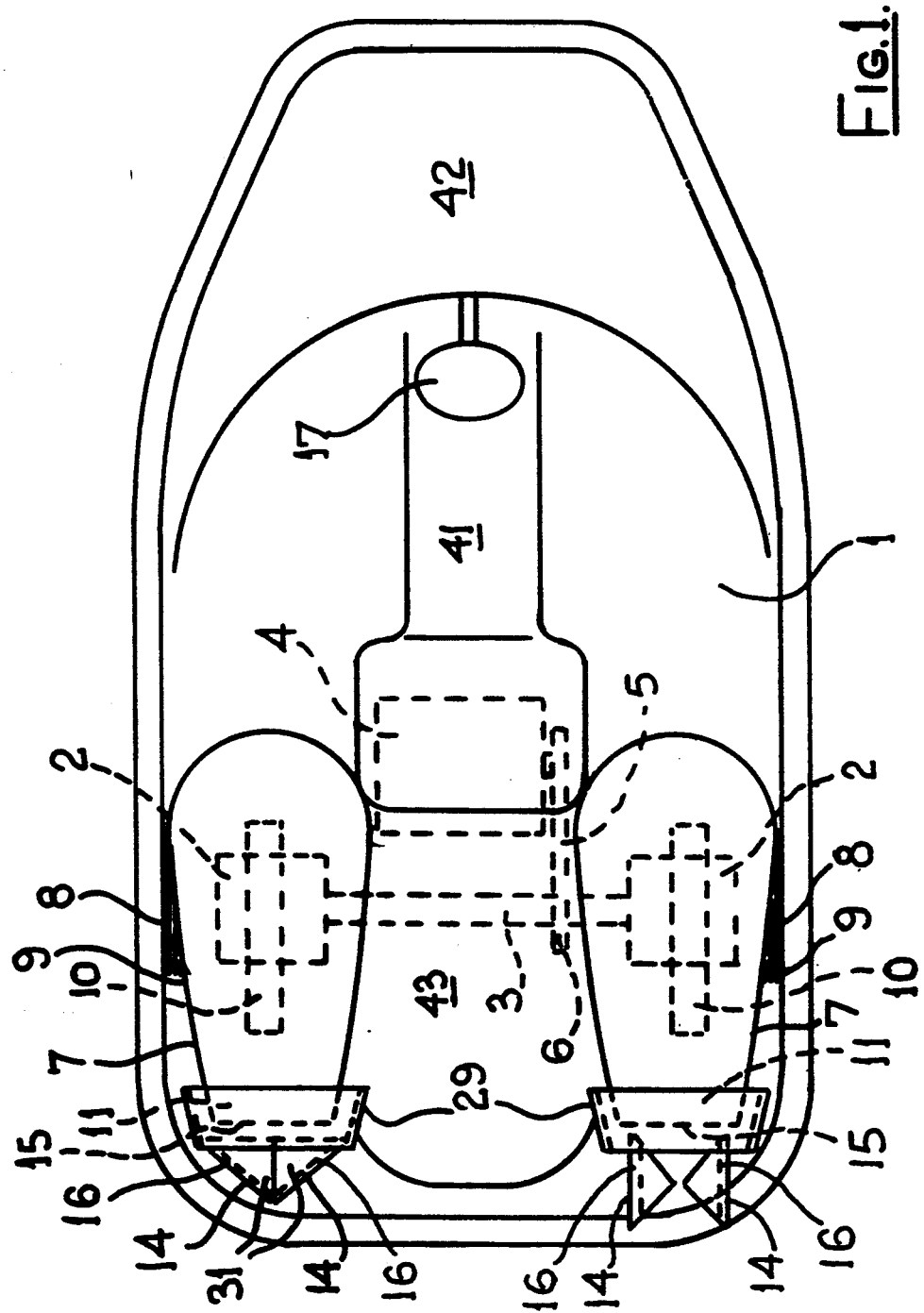
FIG. 1 is a plan view of a hovercraft according to the invention.

The illustrated hovercraft comprises a dish-shaped hull 1 supporting a pair of centrifugal fans 2 mounted on a common transverse drive shaft 3, one either side of the hovercraft towards the rear, as shown in FIG. 1. A centrally located engine 4 drives both fans 2 through a belt drive 5 running over a pulley 6 on drive shaft 3. The fans 2, which may be of known construction, are each housed in an outer housing 7 on a respective side of the hovercraft, and when operating, serve to draw air in through inlet vents 8 in the outer side wall 9 of the housing, and supply a forced flow of air downwards through an opening 10 to the underside of the hull 1 and also rearwards through a duct 11 at the upper rear end of the housing 7.

A flexible skirt 12 depending from the periphery of the hull forms a plenum chamber 13 which is pressurised by the flow of air through the openings 10 so as to support the hovercraft on a cushion of air. The air flowing rearwards through the ducts 11 produces a jet reaction which propels the hovercraft forwards.

Figure 4A:
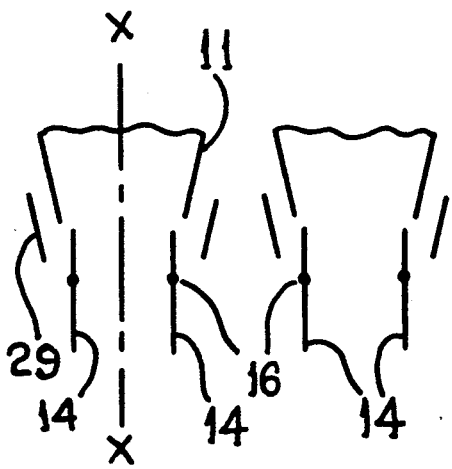
Figure 4B:
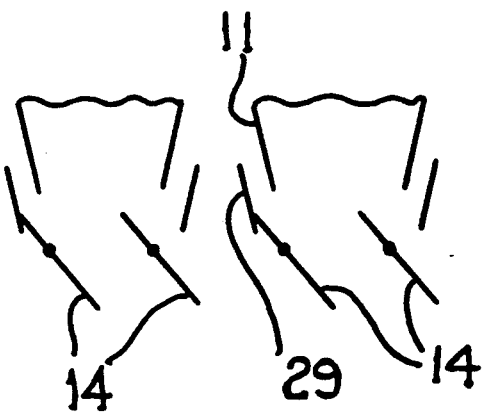

The hovercraft is guided laterally by two pairs of upright rudders 14 that are located rearwards of the outlet openings 15 of ducts 11, as shown in FIG. 1. Each pair of rudders 14 is located one either side of the fore and aft centre line x—x of outlet opening 15 on a vertical, pivotally supported, pivot post 16 spaced slightly inwards from the side wall of the duct 11. The rudders 14 assume a substantial continuation of the duct 11 when they extend directly rearwards. A first manually operable control system serves to control the angular positions of the rudders 14 so that they are held substantially parallel to one another as they are moved between extreme angular positions to direct the air flow from the ducts to one side or the other of the ducts, thereby to apply a left or right turning movement to the hovercraft. As shown for the right hand duct 11 (the lower duct) in FIG. 1, and in FIG. 2, and schematically in FIG. 4a, the rudders 14 are in their rearwardly directed position for forward motion in a straight line. As shown schematically in FIG. 4b, the rudders 14 are in an extreme angular position for a right turn.

Figure 3:
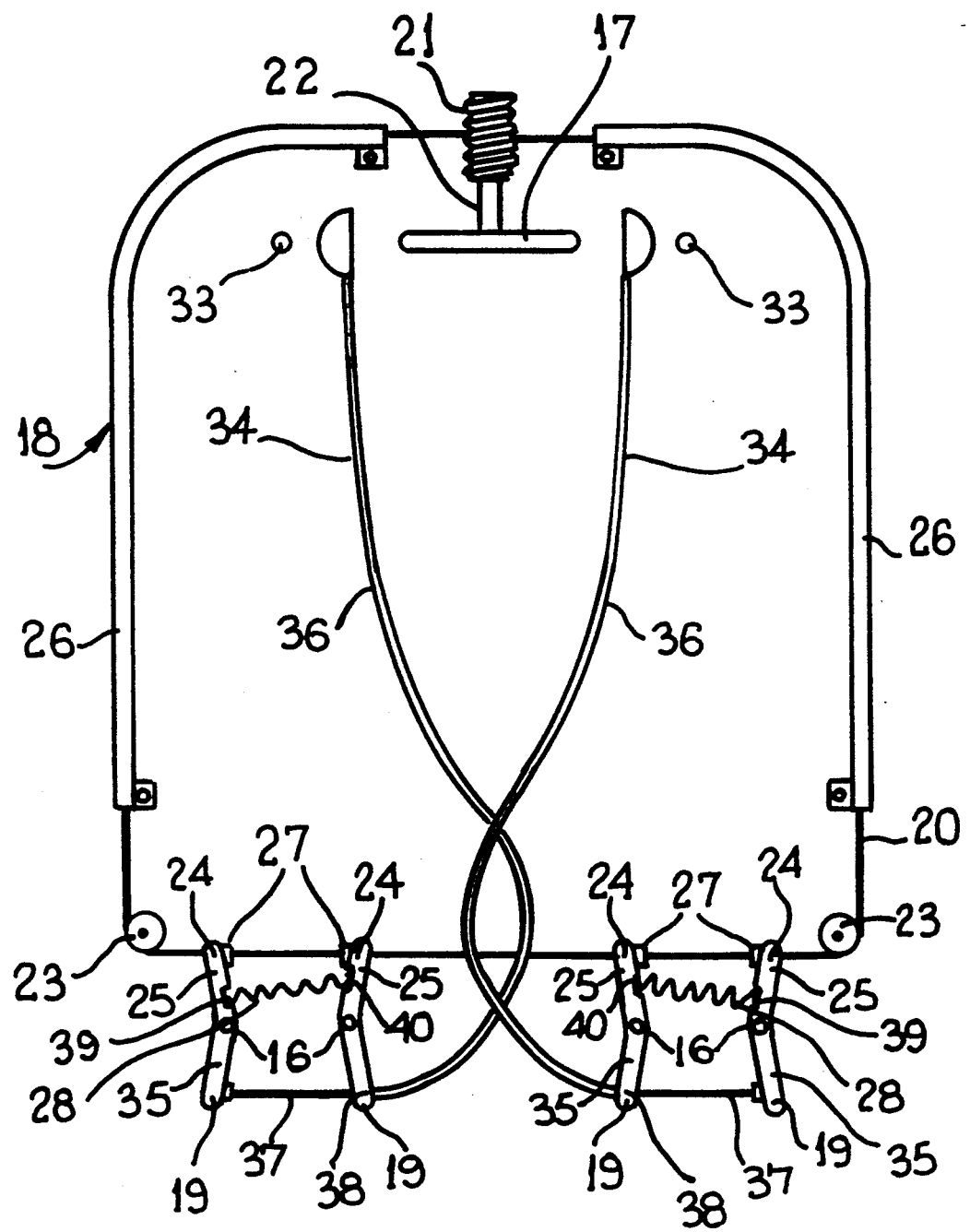
FIG. 3 is a schematic plan view of the rudder control system of the hovercraft in FIGS. 1 and 2, and FIGS. 4a) to 4e) show different orientations of the rudders in controlling the hovercraft of FIGS. 1 and 2.

The first manually operable control system for steering the hovercraft is illustrated in FIG. 3 and comprises a steering wheel 17 at the front of the hovercraft which operates the rudders 14 through a continuous loop control line 18 and bell-crank levers 19 rigidly connected to the lower ends of the rudder pivot posts 16. The line 18 consists of a continuous inner cable 20 that has three turns around a threaded worm 21 at the lower end of the steering wheel shaft 22, and which is guided round pulleys 23 at the rear corners of the hovercraft so that the cable 20 extends laterally across the rear of the hovercraft and passes through apertures 24 in the forwardly projecting arms 25 of the bell-crank levers 19. Outer cables 26 support the inner cable 20 between the worm 21 and each pulley 23. The connection between the inner cable 20 and each pair of bell-crank levers 19 comprises a pair of stops 27 secured to the cable between the arms 25 of the levers, and a tension coil spring 28 connected between the arms 25 so as to urge them both into engagement with the stops 27. Thus, turning the steering wheel 17 for a left hand turn will move the cable 20 to the right as shown in FIG. 3, causing the right hand one of each pair of stops 27 to engage the respective right hand arm 25 and turn it clockwise together with the associated rudder 14 supported on the pivot point 16. The left hand arm 25 of each pair follows the right hand arm 25 through the action of the spring 28 which keeps the left hand arm 25 in engagement with the left hand stop 27. Similarly, when turning the steering wheel for a right hand turn, the cable 20 across the rear moves to the left and the levers 19 and rudders 14 are accordingly rotated in the anti-clockwise sense.

In order to allow the hovercraft to be propelled in the reverse direction, each pair of rudders 14 is further adapted so that they can be closed together across the outlet opening 15 of the duct 11, as shown for the left hand pair of rudders (the upper rudders) in FIG. 1. When the rudders are closed together in this way, the flow of air from the duct 11 is caused to flow forwards around the outside of the duct and thereby produces a reverse thrust. This effect is enhanced by providing a wall or collar 29 around the outside of the outlet opening 15 of the duct so as to channel the reverse flow forwards. The collar 29 is spaced evenly from the side walls 9 and top wall of the duct 11, and extends rearwards beyond the plane of the outlet opening 15 slightly so as to cooperate with the leading edges 30 of the rudders 14, as shown more clearly in FIG. 4. FIG. 4d shows both pairs of rudders 14 closed together with the leading edges 30 of the rudders located closely adjacent the inside surface of the collar 29 to provide as good an air seal as possible.

The upper edges of each pair of rudders 14 are also formed with flanges 31 that are directed inwardly towards one another so as to meet at their inner edges when the rudders are closed together, thereby to close the space therebetween and prevent the upwards escape of the air flow.

Figure 2:
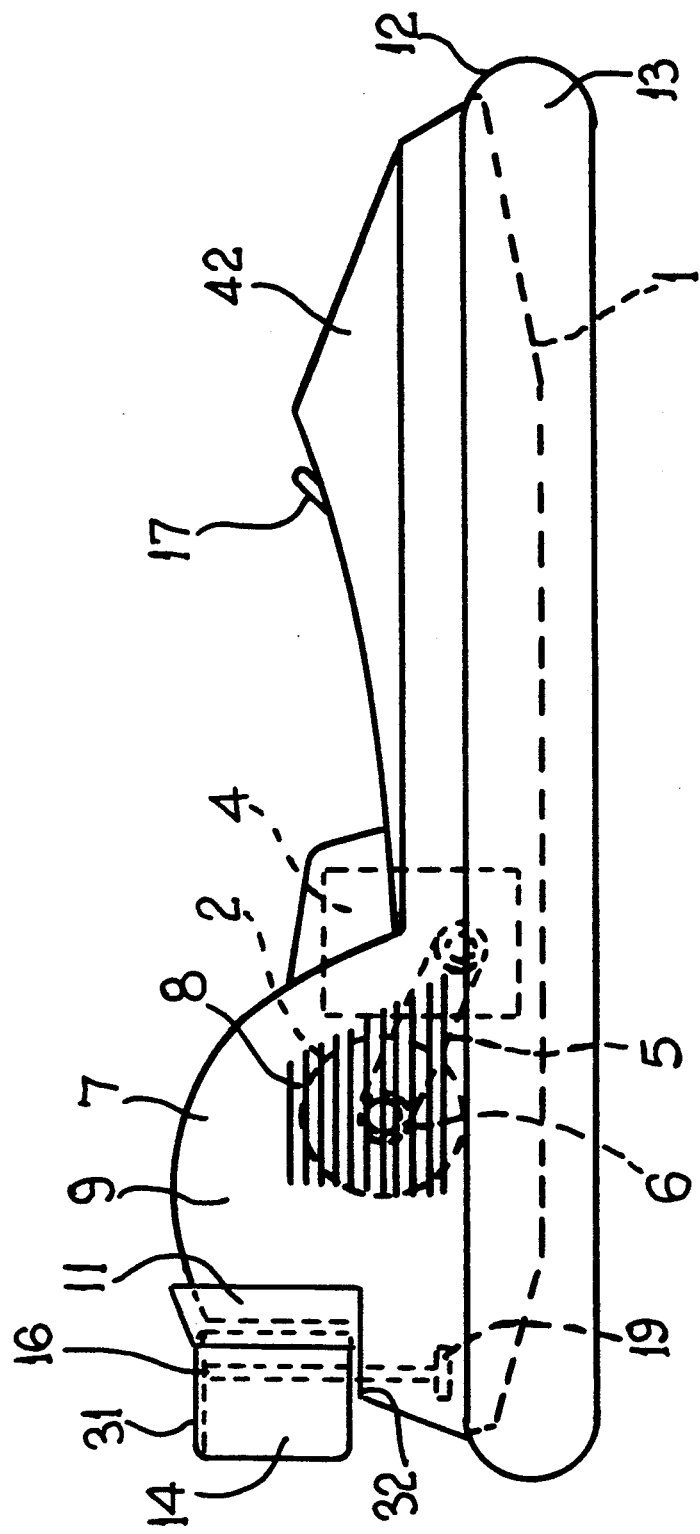
FIG. 2 is a side elevation of the hovercraft of FIG. 1.

As shown in FIG. 2, these flanges 31 extend forwards sufficiently to protrude just inside of the collar 29 just below the top wall thereof so that the reverse flow of air is also directed over the top of the duct 11.

The lower edges of the rudders 14 lie closely adjacent a ledge 32 that extends rearwards from the bottom of the outlet openings of the ducts 11 so that when the rudders are closed together the opening therebetween is substantially closed by this ledge 32.

A second manually operable control system serves to control closing together of each of the pairs of rudders 14 independently of one another and independently of the steering control system. This second control system, as shown in FIG. 3, comprises a pair of control levers 33 each connected via a coaxial control cable 34 to a pair of bell-crank levers 19 controlling a respective pair of rudders 14. The bell-crank levers 19 each have a rearwardly extending arm 35, and each control cable 34 is connected between respective pairs of these arms 35, the outer cable 36 of the coaxial cable terminating at the one arm, and the inner cable 37 passing through an aperture 38 in said one arm and being connected to the other arm 35. At the other end, the inner cable 37 is connected to the control lever 33 so that operation of the lever in one sense will pull the arms 35 together to close the rudders across the duct, and operation in the opposite sense will push the arms 35 apart to open the duct. It will be appreciated that when the control lever 33 is operated to pull the arms 35 together to close the rudders, the forwardly projecting arms 25 of the bell-crank levers 19 are moved apart so that they are clear of the stops 27 on the inner cable 20 of the steering system, thereby over-riding the effect of the steering control system on these closed rudders 14.

As shown in FIG. 4d, both control levers 33 are operated to close the rudders 14 across both ducts 11. The hovercraft is then subjected to full reverse thrust and moves backwards.

Figure 4C:
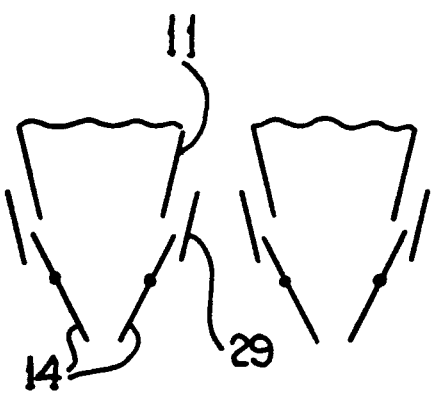
Figure 4D:
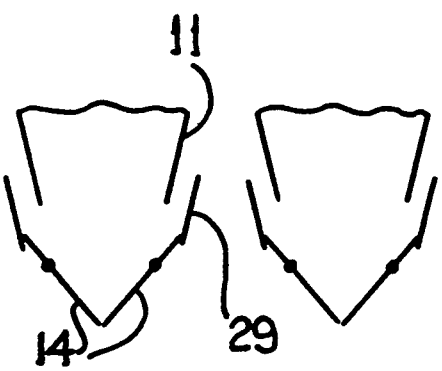

If both control levers 33 are operated to partially close the rudders across the ducts, as shown in FIG. 4c, then the hovercraft is subjected to a reduced reverse thrust and also a reduced forward thrust, and depending on the balance of these forces the hovercraft is propelled either forwards or backwards at a reduced speed. If the two thrust forces are fully balanced then the hovercraft remains stationary.

As well as operating the controls levers 33 together to reduce the speed of forwards movement and control rearwards movement, the control levers can be operated individually for steering the hovercraft.

Figure 4E:
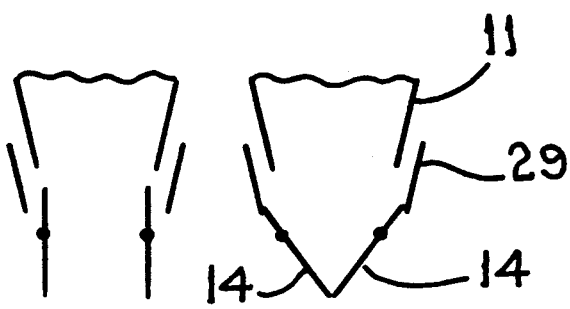

If only one lever 33 is operated to close the associated pair of rudders 14, as shown for the right hand rudders in FIG. 4e, then the hovercraft is subjected to a reverse thrust from one duct and a forward thrust from the other duct, thereby producing a turning moment, which in the case of FIG. 4e, turns the hovercraft to the right. It will be appreciated that any differential operation of the two control levers 33 will produce a turning movement, either with the hovercraft moving forwards or backwards, and can be used for steering purposes.

Also, the two control systems for steering and control can be used simultaneously to control manoeuvring of the hovercraft. For example, with the rudders 14 of one duct closed for reverse thrust, as shown in FIG. 4e, the steering wheel 17 can still be used to control the angular setting of the other pair of rudders 14 to give additional steering control.

A potential difficulty when opening a pair of rudders from the fully closed position, is that unless they open perfectly symmetrically relative to the longitudinal centre line therebetween, there will be a tendency to produce a slight lateral thrust that may be to the left or right depending on which rudder responds more rapidly. This may make steering unpredictable and difficult. In order to avoid this problem, it is arranged that one rudder of each pair moves preferentially compared to the other so as to produce a slight lateral thrust which is predictable and thus can be accommodated or even exploited when steering. This is simply achieved by arranging that the coil spring 28 is connected between the two arms 25 so that the resulting spring force acts about each pivot post 16 at different radii. Thus as shown in FIG. 3, the spring 28 is connected to the outer arm 25 at a point 39 and to the inner arm 25 at a point 40, with the point 40 being located at a greater distance from the respective pivot post 16 compared with the distance of the point 39 from its respective pivot post 16. The spring 28 therefore exerts a greater turning movement on the inner arm 25 than on the outer arm 25, and thus the outer arm tends to move first on opening the rudders from the fully closed position, thereby producing an initial lateral thrust that is directed inwards towards the centre line of the hovercraft. It will be appreciated that when the hovercraft is travelling backwards with both pairs of rudders closed, either pair can be opened momentarily using the respective control lever 33 and will produce an inwards thrust to make fine directional adjustments.

The illustrated hovercraft is designed as a single seater craft with a seat 41 for the driver. A nose housing 42 is provided at the front of the craft and the housings 7 for the two fans 2 are interconnected by a lower housing 43 that allows a good rear view for the driver. A further air inlet vent 44 is provided in this housing for the two fans 2.

I claim:

1. A surface effect vehicle having a propulsion and guidance system comprising a thrust generator for producing a flow of fluid, a pair of ducts each adapted to receive a flow of fluid from the generator and to conduct this to a respective outlet opening, two pairs of rudders, each pair mounted on opposite sides of a respective outlet opening so as to be angularly adjustable relative to the outlet opening to vary the extent to which they obstruct the outlet opening, and a rudder control system comprising a first manually operable control system that controls all of the rudders so as to operate them together in the same sense between extreme angular positions for steering, and a second manually operable control system comprising individual reverse thrust controls each independently operable between a forward thrust position and a reverse thrust position and each controlling one of said pairs of rudders so as to move the respective rudders in the opposite sense to one another across the respective outlet opening when in the reverse thrust position and thereby causing the fluid flow therefrom to be substantially reversed, each thrust reverse control allowing uninhibited movement of the respective pair of rudders when in the forward thrust position but serving to de-couple the respective pair of rudders from the first control system when in the reverse thrust position.

2. A vehicle as claimed in claim 1 in which each thrust reverse control serves to de-couple the respective pair of rudders from the first control system in a progressive manner as it is moved from the forward thrust position to the reverse thrust position so that limited angular movement of the rudders in the same sense under the control of the first control system is possible when the individual one of the reverse thrust controls is in an intermediate position between the forward thrust position and the reverse thrust position.

3. A vehicle as claimed in claim 1 in which the first control system comprises a cable connected to each pair of rudders via a pair of spaced stops secured to the cable and a pair of levers each connected to one of the rudders with spring means connected between the levers to urge them simultaneously into contact with the stops, and in which an individual one of the reverse thrust controls is connected to said pair of levers and serves to disengage them from the stops when moved in the reverse thrust position.

4. A vehicle as claimed in claim 3 in which the spring means is connected between the rudders to move one preferentially compared to the other so as to produce a lateral thrust as the rudders are opened from their closed together position.

5. A vehicle as claimed in claim 1 in which a wall surrounds the duct at the outlet opening and cooperates with the rudders when they are closed together so as to receive the reverse flow of fluid from the outlet opening.

6. A vehicle as claimed in claim 5 in which the rudders, when they are closed together, engage at their trailing edges downstream of the fluid flow and have their upstream edges located closely adjacent to said wall.

7. A vehicle as claimed in claim 5 in which said pair of rudders are pivoted about upright substantially parallel axes.

8. A vehicle as claimed in claim 7 in which the upper edges of the rudders are formed with vanes that are directed inwardly towards one another and meet to substantially close the space between the upper edges of the rudders when the rudders are closed together.

9. A vehicle as claimed in claim 8 in which the vanes cooperate with the wall across the top of the duct to direct the reverse fluid flow beneath it when the rudders are closed together.

10. A vehicle as claimed in claim 7 in which the rudders terminate at their lower edges above a ledge that projects rearwards from the vehicle and substantially closes the opening between the lower edges of the rudders when the rudders are closed together.

11. A vehicle as claimed in claim 1 in which the second manually operable control system is adapted to move one rudder of each pair preferentially compared to the other so as to produce a lateral thrust as said pair of rudders are opened from their closed together position.

12. A vehicle as claimed in claim 11 in which said lateral thrust of each pair of rudders as they are opened as directed inwards relative to the other pair of rudders.

13. A vehicle as claimed in claim 1 in which the thrust generator comprises a centrifugal fan.

14. A vehicle as claimed in claim 1 in which the thrust generator comprises a pair of centrifugal fans each supplying a flow of air to a respective one of said pair of ducts.

15. A vehicle as claimed in claim 14 in which said pair of fans have coaxial drive shafts extending laterally across the vehicle with drive means located therebetween and connected to both drive shafts so as to drive them together.

16. A vehicle as claimed in claim 13 in which the fan or fans supply air to the underside of the vehicle to support it on an air cushion.

* * * * *